July 14, 1970   M. F. WEBSTER   3,520,516
ADJUSTABLE CROWDING ALLEY
Filed Aug. 28, 1967   3 Sheets-Sheet 2
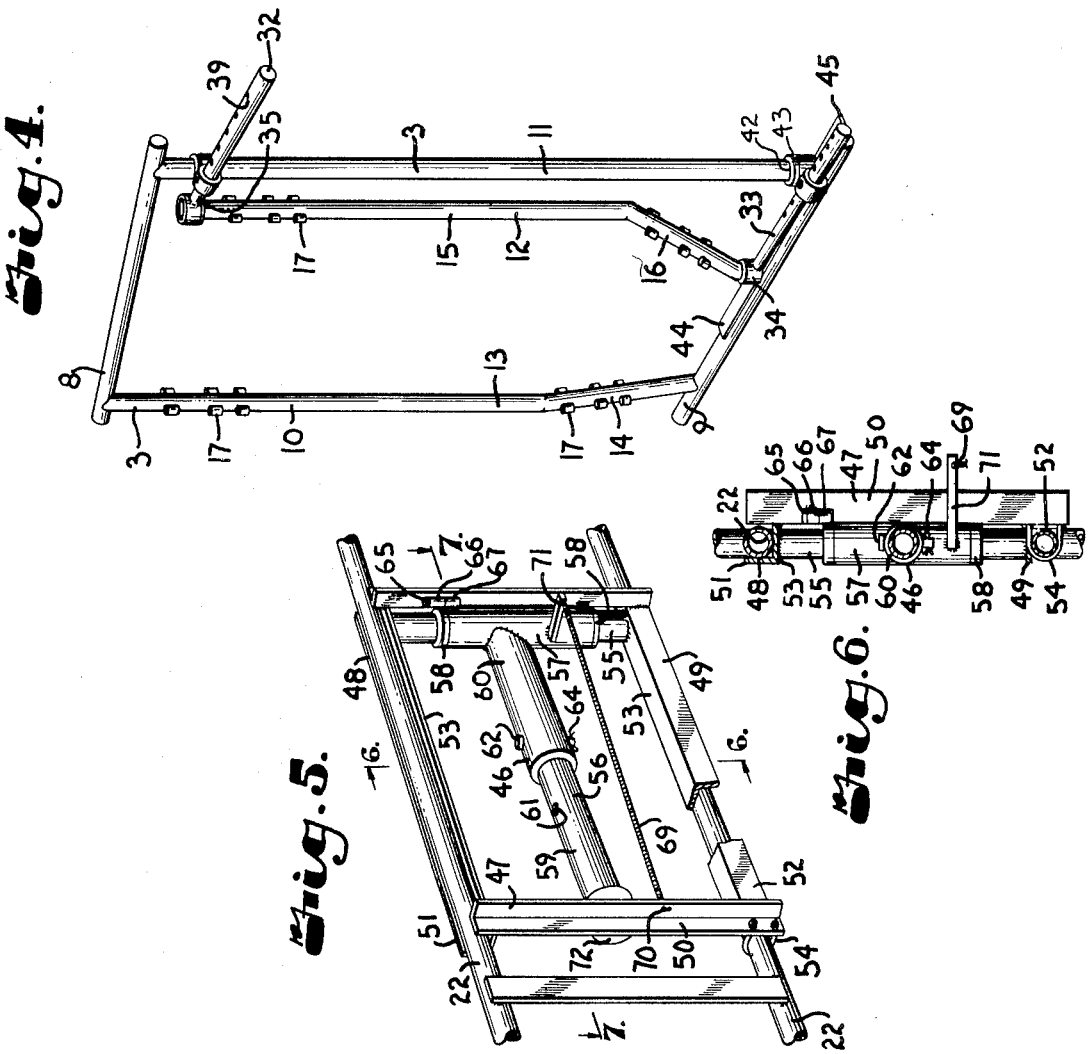
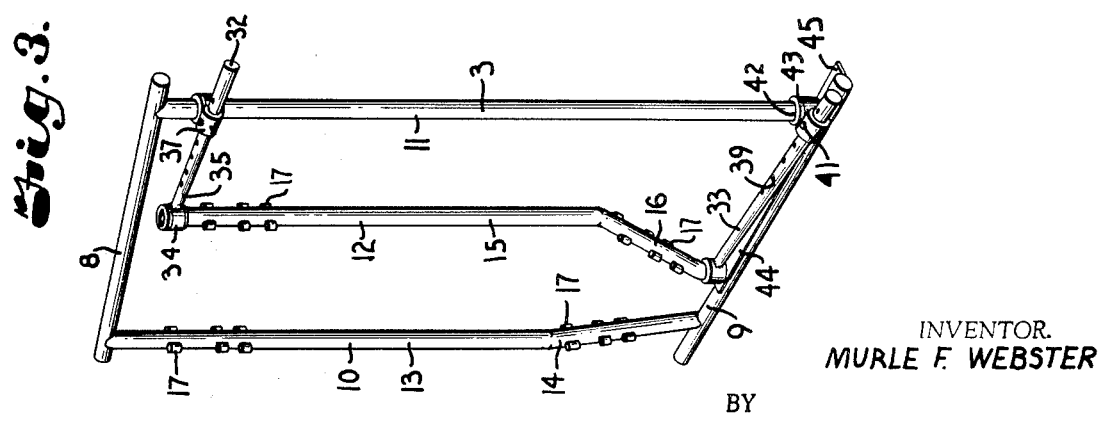
INVENTOR.
MURLE F. WEBSTER
BY
Fishburn, Gold & Litman
ATTORNEYS July 14, 1970 M. F. WEBSTER 3,520,516
ADJUSTABLE CROWDING ALLEY
Filed Aug. 28, 1967 3 Sheets-Sheet 3
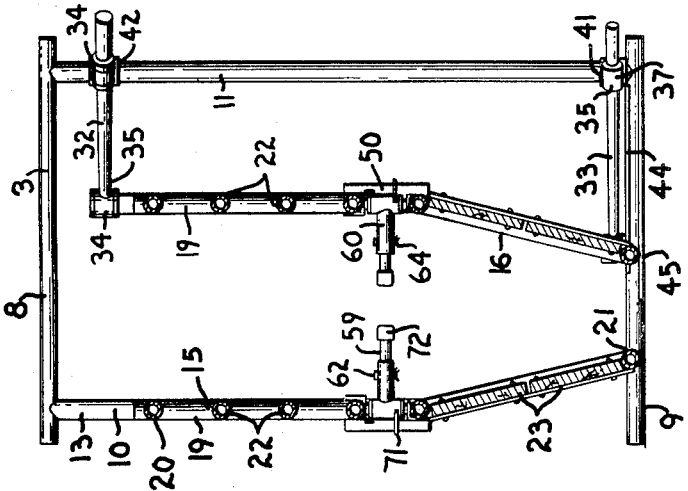
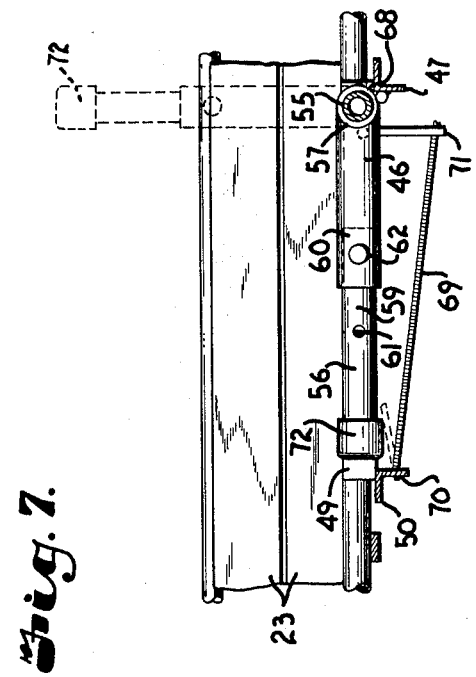
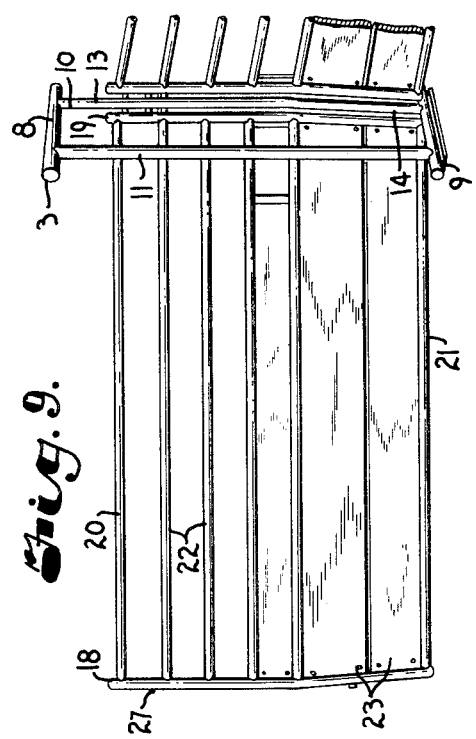
INVENTOR.
MURLE F. WEBSTER
BY
ATTORNEYS United States Patent Office
3,520,516
Patented July 14, 1970

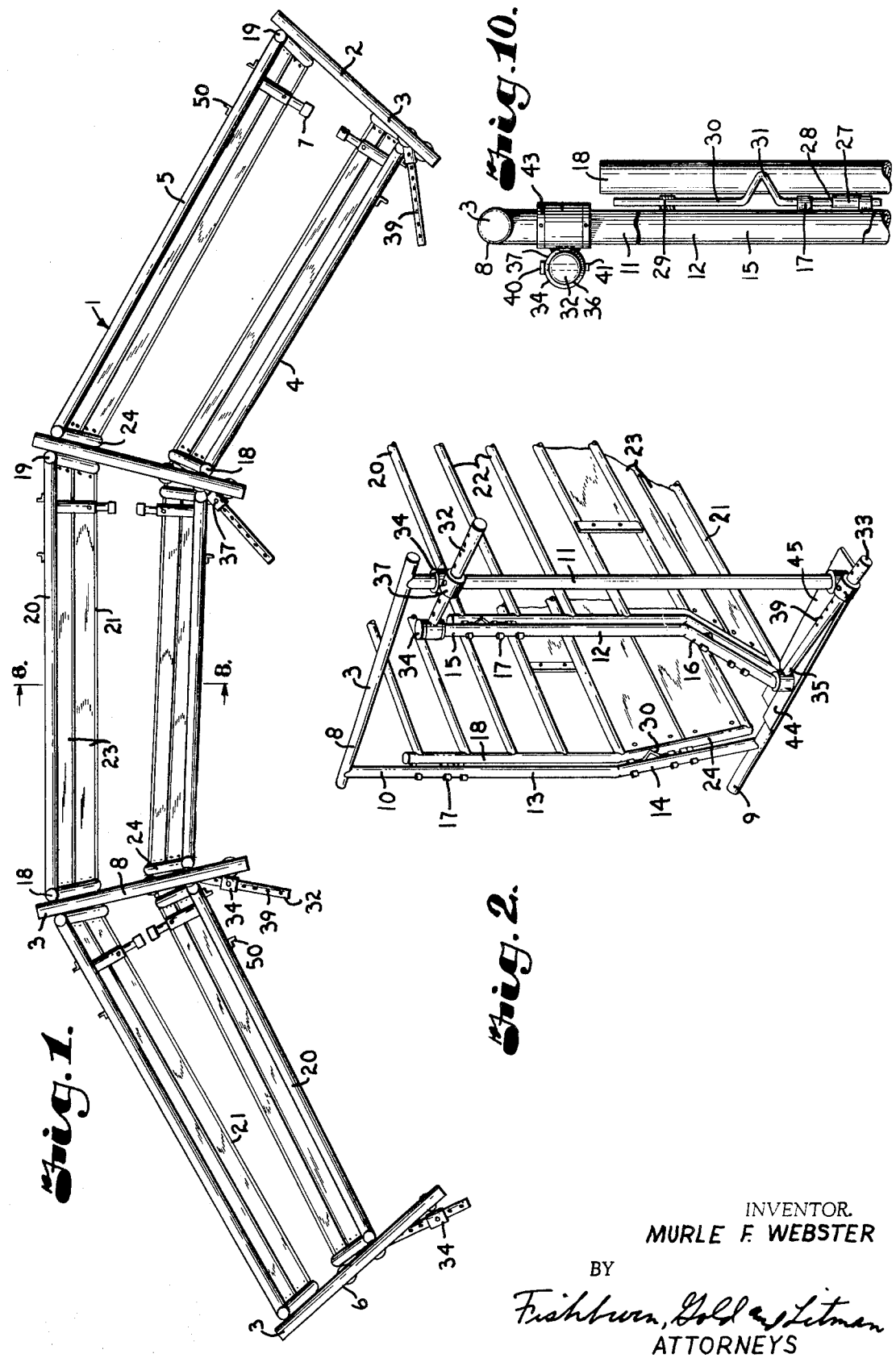

3,520,516
ADJUSTABLE CROWDING ALLEY
Murle F. Webster, Dodge City, Kans., assignor to W. W. Manufacturing Company, Dodge City, Kans., a corporation of Kansas
Filed Aug. 28, 1967, Ser. No. 663,779
Int. Cl. E04h 17/16
U.S. Cl. 256—26          6 Claims

ABSTRACT OF THE DISCLOSURE

An adjustable crowding alley for moving livestock such as horses, sheep, and cattle into branding, spraying, dipping, vaccinating, cutting, dehorning, feeding stations, and the like, said alley having a plurality of longitudinally spaced frames with fixed side panels connecting same at one side and laterally adjustable side panels connecting the other side of said frames. The alley preferably has a one-way gate adjusted to various widths, as for example, from a wide entrance to a narrow exit or to a uniform width depending on size of the cattle being processed and the reason for moving the livestock. The panels each have an upright and a lower portion inclined downwardly and inwardly whereby the alley is narrower at the bottom than at the top. Each side panel has a plurality of closure members adjacent the bottom thereof whereby the lower portion is solid and the livestock are prevented from turning around or lying down.

---

The principal objects of the present invention are: A crowding alley adapted for moving livestock such as cattle, sheep, and horses which is adjustable to define a curved path; to provide an adjustable crowding alley which is portable and which is easy to assemble; to provide an adjustable crowding alley having a narrower bottom than top, and adjustable in width thereby preventing the livestock from turning around or from lying down; to provide an adjustable crowding alley with a plurality of sections, with each section having side panels of fixed length with one of the side panels being laterally adjustable, whereby the curvature of the alley is variable; to provide an adjustable crowding alley having a plurality of spaced frames with outside panels being connected to a fixed frame side post and inside panels being connected to a laterally adjustable frame post whereby the width of the alley is adjustable at the frames; to provide a crowding alley with a plurality of sections and a one-way gate in each section to permit the livestock to move through the alley while preventing the livestock from backing up; to provide such a crowding alley of all metal and strong construction that controls movement of the livestock of any type and size; and to provide an adjustable crowding alley which is economical to manufacture.

Other objects and advantages of this invention will become apparent from the following description taken in connection with the accompanying drawings wherein are set forth by way of illustration and example certain embodiments of this invention.

FIG. 1 is a plan view of an adjustable and curved crowding alley embodying the features of the present invention.

FIG. 2 is a partial perspective view of the exit end of the crowding alley.

FIG. 3 is a perspective view of an adjustable frame in a narrow position.

FIG. 4 is a perspective view of an adjustable frame in a wide position.

FIG. 5 is a partial perspective view showing the one-way gate in the open position.

FIG. 6 is a partial vertical sectional view through the one-way gate taken on line 6—6, FIG. 5.

FIG. 7 is a partial horizontal sectional view showing the one-way gate with the closed position shown in broken lines and taken on line 7—7, FIG. 5.

FIG. 8 is a transverse sectional view taken on line 8—8, FIG. 1.

FIG. 9 is a perspective view of a section frame showing outside panels connected thereto.

FIG. 10 is a detail view of the connection between the upright portions of the frame and a side panel with portions broken away to show same.

Referring more in detail to the drawings:

The reference numeral 1 generally designates an adjustable crowding alley which is particularly adapted to moving livestock such as cattle, sheep, and horses in a defined path as from one field, pen, or corral to a treating station or to another field, pen, or corral. The alley 1 is adapted for moving livestock into branding, spraying, dipping, vaccinating, cutting or separating, dehorning, feeding stations, and the like.

The livestock enter the alley 1 at an entrance end 2 through a frame 3, pass between side panels 4 and 5, and leave the alley 1 at an exit end 6 through a frame 3. In the illustrated structure the alley 1 consists of a plurality of sections with each section extending between a pair of frames 3 and with one of the side panels, as, for example, side panel 4, being shorter than the other side panel 5, whereby the sections are adapted to be positioned at an angle with adjacent sections. The shorter side panel 4 is laterally adjustable with reference to the longer side panel 5 whereby the lateral spacing between the panels 4 and 5 may be varied from a maximum to a minimum at each frame and preferably from a maximum opening at the entrance end 2 to a minimum at the exit end 6. A one-way gate 7 may be installed in any of the inside panels 4 or any of the outside panels 5 or both to control movement of the livestock through the alley 1.

Each frame 3 includes a horizontal top rail 8 which is vertically spaced apart from a horizontal bottom rail 9. A pair of upright or side members 10 and 11 are laterally spaced apart and extend between the top and bottom rails 8 and 9 respectively and are suitably secured thereto as by welding. A laterally adjustable upright member 12 is mounted between the fixed side members 10 and 11 and is adapted to be moved and to be retained in selected adjusted positions as later described. It is preferred that the frame members and rails be tubular for strength with lightness of weight and absence of sharp edges on portions that could cause injury to stock. One of the fixed side members, as for example, member 10, has an upper upright portion 13 and a lower portion 14 inclined relative thereto. The laterally adjustable frame member 12 also has an upper upright portion 15 and a lower inclined portion 16 substantially corresponding to the respective portions of the side member 10.

The side members 10 and 12 of each frame 3 are provided with connection portions for the side panels and in the illustrated structure each have vertically spaced tubular bosses 17 secured thereto, with the longitudinal axis of each of the bosses 17 being parallel with the longitudinal axis of the respective portions of the members 10 and 12. In the illustrated structure three bosses 17 are installed on each upper portion 13 and 15 and on each lower portion 14 and 16 for connection with side panels as later described.

The shorter side panel 4 and the longer side panel 5 may be of any suitable structure and may be of open or solid construction. In the structure illustrated, each panel 4 and 5 has a pair of longitudinally spaced end posts 18 and 19 which are shaped to substantially correspond to side members 10 and 12 of frame 3. The panels also have a horizontal top rail 20, a horizontal bottom rail 21, and a plurality of intermediate rails 22 of fixed length. The rails are vertically spaced with and suitably secured to the posts 18 and 19 as by welding. The rails and posts are preferably tubular for strength, lightness of weight and absence of edges or projections. A plurality of filler members 23 of suitable material such as wooden planks or boards may be placed in the side panels 4 and 5 between certain rails and extend between the end posts 18 and 19. Due to the shape of the end posts 18 and 19 each panel has a lower inwardly inclined portion 24 defined by the bottom and an intermediate rail and the filler members 23 are secured in said inclined portions 24 to fill the space between the rails thereof. In the illustrated structure the inclined portion 24 is located between the bottom rail 21 and next two adjacent intermediate rails 22. The inclined portions 24 of the shorter side panels 4 and the longer side panels 5 cooperate to narrow the alley 1 with the lower portion tapering downwardly to the bottom rails 21 and extending inwardly toward the opposed side panel.

The filler members 23 in the inclined portions 24 prevent the livestock in the alley 1 from turning around and from lying down by providing a solid inclined face on which the hoofs slip. The filler members 23 may also be installed between any other adjacent intermediate rail 22 if desired.

The crowding sections are connected by the panels 4 and 5 being connected to the frame side members 10 and 12. Each of the panel end posts 18 and 19 have tubular bosses 27 fixed thereon in a position to mate with respective bosses 17 on the frame side posts with the axis of the bores 28 of the bosses 27 aligned with bores 29 of the respective mating bosses 17 to receive connecting members 30. It is preferred that the connections permit pivotal movement of the panels relative to the frames and in the illustrated structure the connecting members are elongate pins inserted in the respective bores. The pins have offset portions 31 between spaced bosses permitting limited longitudinal movement of the pins so that said pins remain on the frame side members. The offset portions 31 also form handles facilitating moving of the pins.

The shorter side panel 4 is connected at ends thereof to the laterally adjustable frame side members 12 of spaced frames and the longer side panel 5 is connected at ends to the frame side members 10 of the corresponding frames whereby the side panels are opposed and define sides of the alley between said frames connected thereto. The space between the frame side members forming the entrance and exits to that portion of the alley. The pins 30 are sized to fit loosely in the bores of the bosses 17 and 27, thereby permitting pivoting of the side panels and easy lateral movement of the shorter side panels 4 for adjusting the curvature and width of the alley portion.

In the illustrated structure the frames 3 are in radial relation to a common point (not shown) and the longer side panels 5 form chords of a circle having a radius equal to the distance between the common point and the one side member 10. The relative length of the longer side panels 5 and the shorter side panels 4 insure the curving of the curving of the crowding alley 1. It is to be understood that the frames may have other relative angular position so sections may be at different angular relation to adjacent sections and the curvature of the path varied.

An advantage in having the crowding alley 1 curved is that it prevents the livestock from seeing what is happening to other livestock ahead of it in the alley 1 and becoming frightened thereby. Livestock will follow other livestock through the curved alley 1 under conditions where they would be difficult to handle in straight alleys.

The laterally adjustable frame side member 12 is movable with reference to the other adjacent member 11. The member 12 is rotatably mounted on upper and lower arms 32 and 33 which are slidable and rotatable relative to the side member 11 so the side member 12 may be selectively positioned for alley width and curvature. In the structure illustrated the arms 32 and 33 have bearing sleeves 34 on ends 35 and the upper and lower end portions of the side member 12 has bearing portions mounted in said respective sleeves. The upper and lower guide members or arms 32 and 33, respectively, extend from the sleeves and are slidably mounted in bores 36 of mounting members 37 which are rotatable on the upper and lower portions of the side member 11. The arms sliding in the members 37 permit the spacing between the side member 12 and other frame side members to be varied with fastener members 33 holding them in selected position. The fastener members may be any suitable connector and that shown are a plurality of holes 39 longitudinally spaced along the arms 32 and 33 and adapted to selectively align with holes 40 in the members 37 to receive locking pins 41.

The arms 32 and 33 rotate on swing relative to the frame and in the illustrated structure the mounting members 37 have bores 42 at right angle to the bores 36 and the side member 11 has bearing portions rotatable, received in said bores 42. Suitable shoulders or collars 43 are arranged on the side members 11 and 12 to engage the bearing members 37 and sleeves 34 to retain the arms against up and down movement on said side members.

The bottom of each laterally adjustable side member 12 and the sleeve 34 thereon may slide directly on the bottom rail 9 of the respective frame 3, however, a slide plate 44 preferably is installed on a top surface of the bottom rail 9 to provide a suitable surface to support the sleeve 34 and facilitate lateral adjustment of the side member 12. The bottom rails 9 may also have a plate 45 secured thereto and extending from the bottom portion to provide a supporting surface to ends of the panel 4 to reduce drag on the ground in adjusting alley width.

When it is desired to prevent the livestock from backing up in the alley 1, a one-way gate may be suitably secured to selected side panels preferably adjacent on entrance of an alley section to permit the livestock to move forward through the alley 1 while preventing the livestock from backing up. The gate members may be on one side panel or on both in opposed relation depending on width and gate size. When used on both sides the gates and mounting therefor are the same in reversed position. The gates 46 include a mounting structure having a frame 47 adapted to be secured to a pair of adjacent intermediate rails 22. The gate frame 47 has spaced horizontal members 48 and 49 with end portions secured to upright end members 50. In the illustrated structure, the gate frame members are structural members such as angles. The upper frame member 48 has an upstanding leg 51 which is positioned to engage the alley side of an intermediate rail 22. The lower frame member 49 has a downwardly depending leg 52 which is positioned to engage the exterior side of the adjacent intermediate rail with each member 48 and 49 having a leg 53 engaging under and above respectively on the intermediate rails. Suitable fastening members such as U-bolts 54 embrace an intermediate rail and are secured to the end members 50 adjacent the lower member 49 to removably mount the gate frame on the respective side panel.

A tubular gate post 55 extends vertically between the horizontal legs 53 of the horizontal frame members 48 and 49, respectively, and is suitably connected thereto. A gate arm 56 is pivotally mounted on the gate post 55 and as shown the arm 56 has a bearing member 57 sleeved on the post between a pair of vertically spaced annular flanges 58 which are suitably secured to the gate post 55 intermediate its ends whereby the arm swings on said post.

It is preferred that the gate arm 56 be adjustable in length to accommodate different width of spacing between the alley defining side panels 4 and 5. The gate arm 56 is shown as a pair of telescoping members 59 and 60, the member 60 being fixed to the bearing member 57 and the member 59 sleeved in said member 60. The arm members 59 and 60 have a plurality of longitudinally spaced holes 61 adapted to align for different length of extension and receive a pin or like fastening device 62 to retain the gate arm 56 at the selected length. A cotter pin or keeper 64 is applied to the pin 62 to retain same in the gate arm 56.

Each gate arm 56 has an open position as shown in FIGS. 5 and 6 and a closed position as shown in FIG. 7 in broken lines. The gate arm 56 is retained in the open position by a suitable fastener such as a pin or bolt 65 being inserted into a pair of vertically alignable bores in ears 66 and 67. One on the gate bearing member 57 and the other on one of the vertical frame members 50. An abutment member 68 is suitably secured to the gate member 57 and limits the travel of the gate arm 56 to an arc between the open position and the closed position by engaging one of the vertical frame members 50. The abutment member 68 and the ear 66 alternately engage the frame member 50 during operation of the gate arm 56. The gate arm 56 is urged away from the open position toward the closed position where the abutment member 68 abuts or engages the vertical frame member 50 by a resilient member such as a spring 60 which has opposite ends suitably secured to the other vertical frame member as at 70 and to a finger 71 which is suitably secured to the gate bearing member 57. The gate arm 56 has a suitable protective end 72 on the free end said end being rounded to prevent injury to the livestock passing through the alley 1. The engagement of the abutment member 68 with the vertical frame member 50 prevents the livestock in the alley 1 from backing up.

In operation, the livestock engage each of a pair of gate arms 56 in the closed position with their chests or legs and move the respective arms 56 toward the respective side panels 4 and 5. The spring 69 urges the gate arms 56 into the closed position when the livestock pass beyond the respective gate 46. When an animal is between the gates 46 in successive sections of the alley 1, the animal can only go forward because the spring 69 returns the gate arms 56 to the closed position where the abutment member 68 engages the frame member 50, thereby limiting further swinging in that direction.

The crowding alley 1 is particularly adapted to moving livestock from the size of lamb to the size of large bulls. For example the alley may be narrowed to widths in the nature of ten (10) inches at the bottom rails 21 and twenty-one (21) inches between the upper portions of the side panels 4 and 5, or widened to about twenty-one (21) inches at the bottom rails 21 and thirty-two (32) inches between the upper portions.

The various components of the alley 1 are of lengths such that the frames 3 and the respective side panels 4 and 5 may be easily loaded and transported in the standard size trucks, such as pickups, flat beds, and the like. The gates 46 and frames therefor may be transported separately and installed in the respective side panels 4 and 5 during erection of the alley 1, or the gates and frames may be installed in the respective side panels 4 and 5 and transported as a unit. The alley 1 is adapted to be erected on any surface which is suitable for the moving of livestock, such as fields, pens, and the like. Assembly of the crowding alley 1 involves positioning the first or entrance frame 3 in the desired location and connecting the side panels 4 and 5 thereto. The other frames are positioned and the panels connected to form the desired number of sections and curvatures then the side members 12 are adjusted at each frame to provide the desired width of the respective alley path therebetween.

It is to be understood that while certain forms of this invention have been illustrated and described, it is not to be limited to the specific form or arrangement of parts herein described and shown except insofar as such limitations are included in the claims.

I claim:
1. An adjustable crowding alley defining a path for movement of livestock therethrough from an entrance end to a working area comprising:
   (a) a plurality of first side panels having ends, means connecting an end of one of said first side panels relative to an adjacent end of the next adjacent first side panel, said first side panel being in angular relation one to and forming a non-linear structure,
   (b) a plurality of second side panels having ends, means connecting an end of one said second side panel relative to an adjacent end of the next adjacent second side panel, said second side panels being laterally spaced from the first side panel and cooperating therewith to define a path therebetween extending from an entrance at one end to a working area at the other end,
   (c) said first and second panels being arranged in sections,
   (d) said connecting means each including a frame with laterally spaced side members with one end of said first side panels connected to one side member and one end of said second side panels connected to the other side member,
   (e) said first and second side panels extending in laterally spaced relation to the respective frame side members and having connection at their other ends to a frame member of the connecting means of the next section,
   (f) each of said frames having a horizontal top rail and a bottom rail in vertically spaced relation and connected by said one frame side member,
   (g) a third side member extending between and connected to said top and bottom rails in laterally spaced relation to said one frame side member,
   (h) said other side member being laterally adjustable relative to said one frame side member and adapted to be retained in each selected adjusted position between said spaced frame side members, and
   (i) the angular relationship of the sections being such that said path is generally curved and the work area is out of the sight of livestock in the path.

2. An adjustable crowding alley as set forth in claim 1 wherein each frame has the laterally spaced side members connected to the top and bottom rails in fixed relationship, the adjustable side member is supported on vertically spaced arms movably mounted on said third side members and extending therefrom toward said one side member and having ends spaced therefrom, said arm ends being connected to adjacent ends of the second panel, said arms being movable relative to the respective other fixed frame side member to vary the spacing between the first and second side panels.

3. An adjustable crowding alley as set forth in claim 2 wherein said other frame side member is a post-like member and said one frame side member and said post-like member each have substantially upright upper portions and lower portions inclined downwardly and inwardly therefrom and the side panels have substantially corresponding upright upper portions and downwardly and inwardly inclined lower portions whereby the path between said panels narrows at the bottom thereof.

4. An adjustable crowding alley as set forth in claim 3 wherein the means movably mounting the arms on said third frame side members include members rotatable on said third side frame members for swinging movement of said arms relative thereto and the post-like members are pivotally mounted on the free ends of said arms, said arms being slidable relative to the arm mounting members for varying the spacing between the post-like member and said one side frame members with means for securing the arms in selected adjusted position on the respective mounting members.

5. An adjustable crowding alley as set forth in claim 3 wherein the first named side panels are longer than the second named side panels and each have end posts with a plurality of vertically spaced rails extending between and connected thereto and filler means between the rails and the lower inclined portions to prevent an animal from stepping between the rails.

6. An adjustable crowding alley as set forth in claim 5 and including:
- (a) a frame having upper and lower members adapted to be positioned between adjacent rails in a side panel with the upper member having upstanding means engaging one side of the adjacent rail and the lower member having a depending means engaging the other side of the respective rail,
- (b) means securing the frame to one of said rails,
- (c) said frame having a post member extending between and fixed to said upper and lower members,
- (d) a one-way gate means swingably mounted on said post and extending toward the other side panel to bar passage between the panels,
- (e) means limiting the swinging movement whereby the gate means is swingable only toward the panel on which it is mounted to permit passage between the panels.

References Cited
UNITED STATES PATENTS

| | | | |
|---|---|---|---|
| 425,478 | 4/1890 | Webster | 119—99 |
| 1,621,760 | 3/1927 | Stader et al. | 119—99 X |
| 2,991,755 | 7/1961 | Ekren et al. | 119—99 X |
| 3,079,711 | 3/1963 | Turner | 119—155 X |
| 3,370,835 | 2/1968 | Crowson | 119—98 X |

HUGH R. CHAMBLEE, Primary Examiner

U.S. Cl. X.R.

119—20, 99